(12) United States Patent (10) Patent No.: US 8,737,307 B2
Kim et al. (45) Date of Patent: May 27, 2014

(54) APPARATUS FOR PERFORMING COMP COMMUNICATION USING A PRECODED SOUNDING REFERENCE SIGNAL AND METHOD OF THE SAME

(75) Inventors: Hyung Tae Kim, Anyang-si (KR); Han Byul Seo, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 13/518,216

(22) PCT Filed: Dec. 22, 2010

(86) PCT No.: PCT/KR2010/009195
§ 371 (c)(1),
(2), (4) Date: Jun. 21, 2012

(87) PCT Pub. No.: WO2011/078571
PCT Pub. Date: Jun. 30, 2011

(65) Prior Publication Data
US 2012/0275411 A1 Nov. 1, 2012

Related U.S. Application Data

(60) Provisional application No. 61/289,385, filed on Dec. 22, 2009, provisional application No. 61/324,756, filed on Apr. 16, 2010.

(51) Int. Cl.
*H04W 4/00* (2009.01)
(52) U.S. Cl.
USPC .......................................... 370/328; 370/330

(58) Field of Classification Search
USPC .............. 370/334, 344, 208, 349, 328, 310.2, 370/330
See application file for complete search history.

(56) References Cited

U.S. PATENT DOCUMENTS

| 8,374,277 B2* | 2/2013 | Nakao et al. .................. 375/267 |
| 2009/0046800 A1 | 2/2009 | Xu et al. |
| 2009/0181691 A1 | 7/2009 | Kotecha et al. |
| 2009/0286482 A1 | 11/2009 | Gorokhov et al. |
| 2011/0256897 A1* | 10/2011 | Taoka et al. ................... 455/509 |
| 2012/0113950 A1* | 5/2012 | Skov et al. .................... 370/329 |

* cited by examiner

*Primary Examiner* — Brenda H Pham
(74) *Attorney, Agent, or Firm* — Birch, Stewart, Kolasch & Birch, LLP

(57) ABSTRACT

An apparatus for performing coordinated multiple point (CoMP) communication using a precoded sounding reference signal, and a method for same are discussed. The method according to an embodiment of the present invention includes: a base station receiving, from a terminal in a neighboring cell, a sounding reference signal (SRS) precoded by a first matrix; acquiring an effective neighboring channel matrix using a hermitian matrix of the first matrix from the received SRS, and a downstream link channel matrix between the terminal and base station; and determining a precoding matrix to be transmitted to one or more terminals served by the base station on the basis of the effective neighboring channel matrix. Here, the effective neighboring channel matrix indicates a direction toward which a receiving beam should be directed such that the terminal can receive data from a serving base station thereof.

10 Claims, 16 Drawing Sheets

FIG. 3
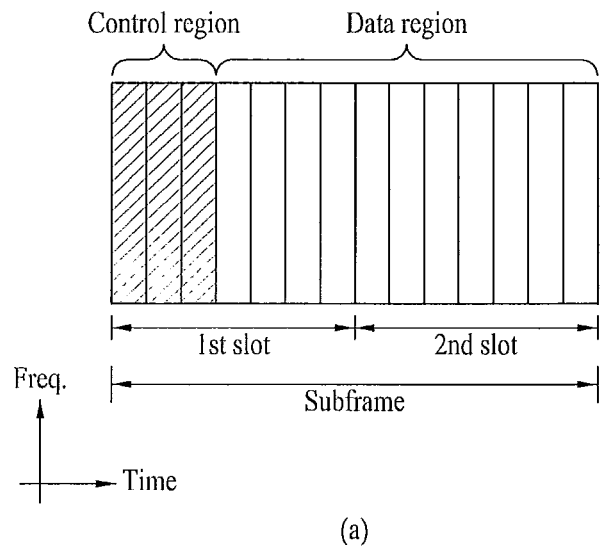
(a)
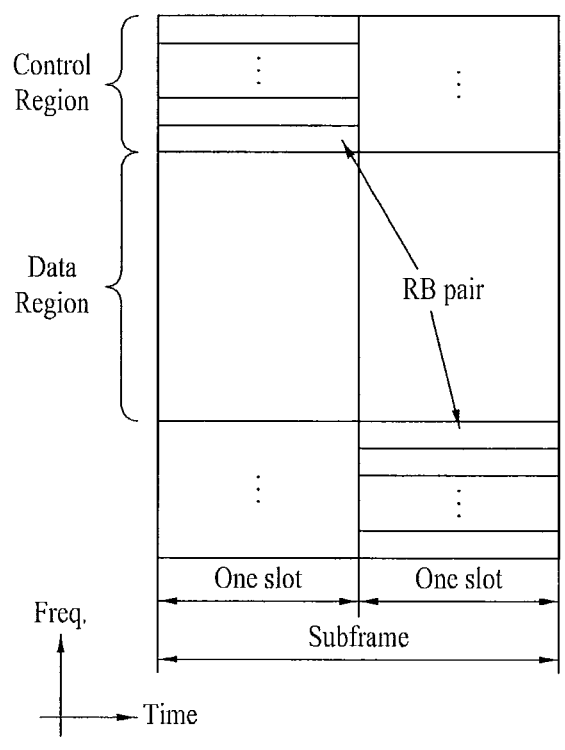
(b)

FIG. 9
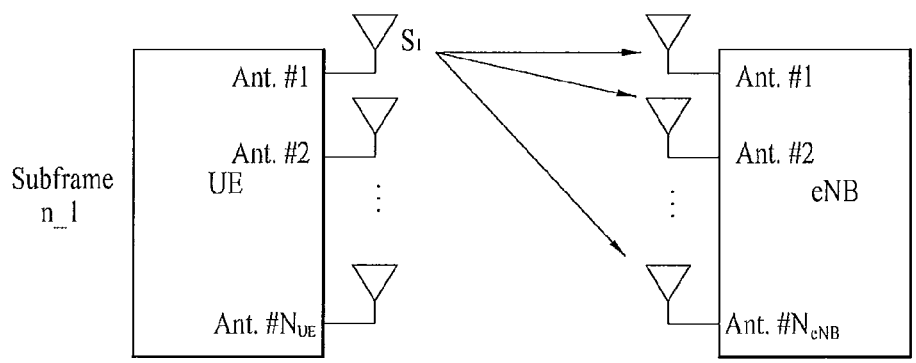
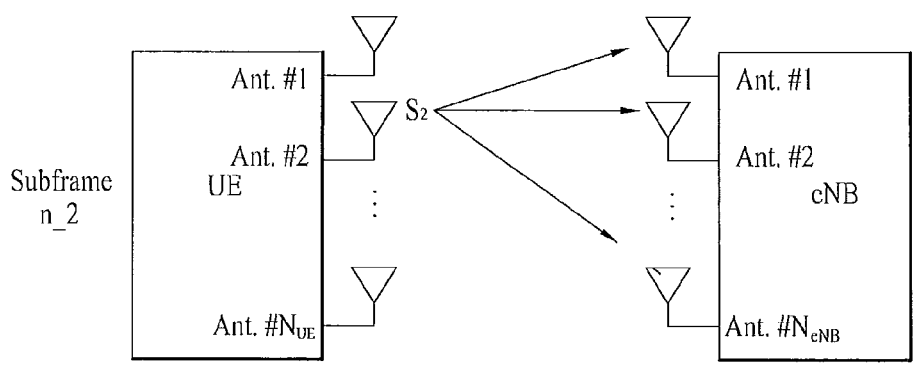
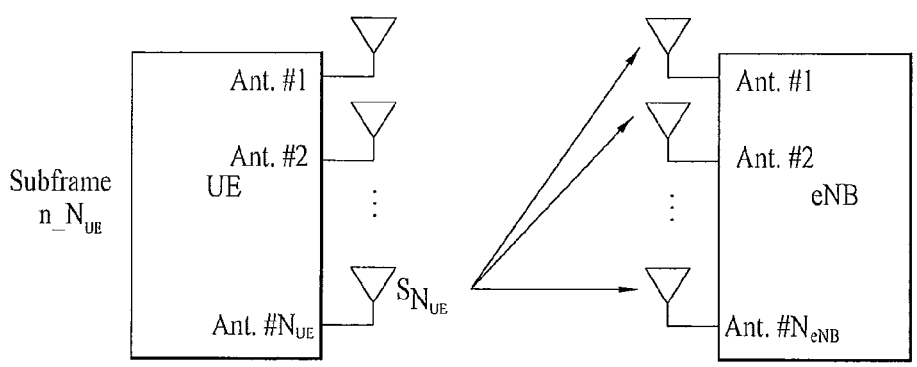

FIG. 10
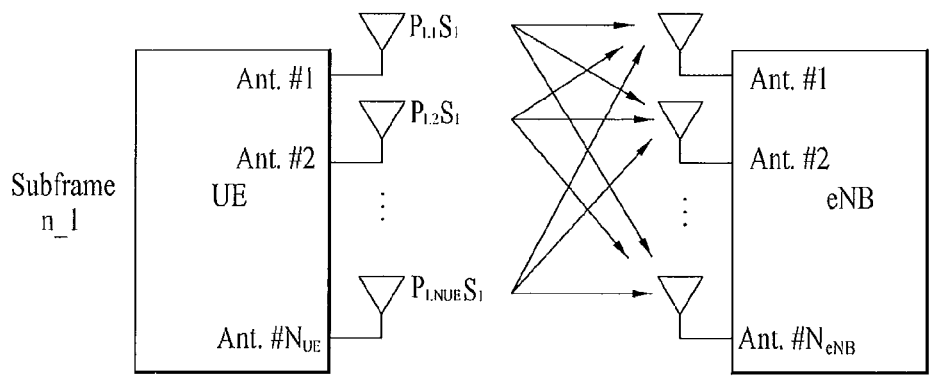
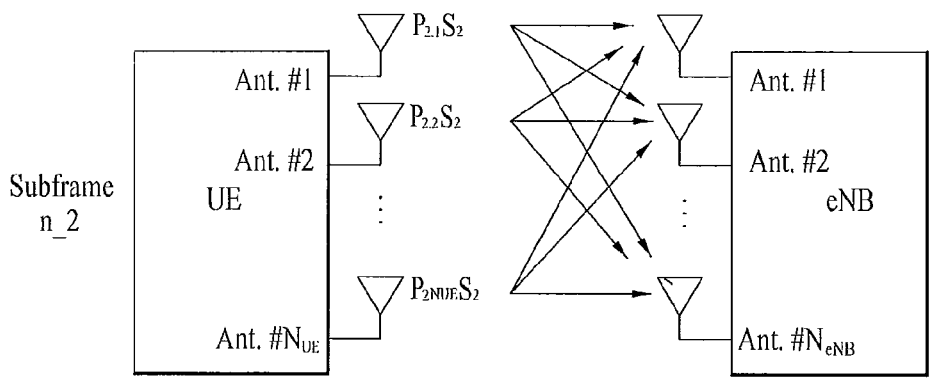
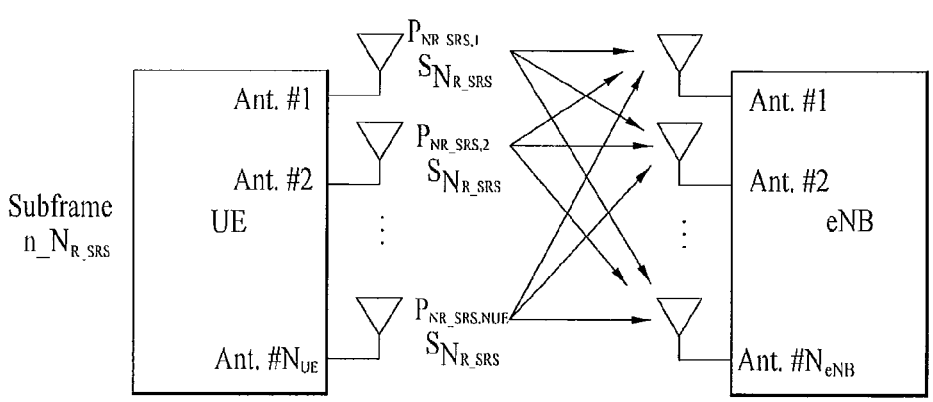

APPARATUS FOR PERFORMING COMP COMMUNICATION USING A PRECODED SOUNDING REFERENCE SIGNAL AND METHOD OF THE SAME

This application is the National Phase of PCT/KR2010/009195 filed on Dec. 22, 2010, which claims priority under 35 U.S.C. 119(e) to U.S. Provisional Application Nos. 61/289,385 filed on Dec. 22, 2009 and 61/324,756 filed on Apr. 16, 2010, all which are hereby expressly incorporated by reference into the present application.

TECHNICAL FIELD

The present invention relates to a wireless communication system, and more particularly, to an apparatus for performing CoMP communication using a precoded sounding reference signal and a method for the same.

BACKGROUND ART

A coordinated multi-point (CoMP) system is the system for improving throughput of a user located at the cell edge by applying improved MIMO transmission under the multi-cell environment. If the CoMP system is used, inter-cell interference may be reduced under the multi-cell environment. In case of the CoMP system, a user equipment may commonly be supported with data from multi-cell base stations.

Also, each base station may improve system throughput by supporting same radio frequency resource to one or more user equipments UE1, UE 2, . . . , UE K at the same time. Also, the base station may perform a space division multiple access (SDMA) method based on channel state information (CSI) between the base station and the user equipment.

The CoMP system may be divided into a coordinated MIMO (Co-MIMO) type joint processing (JP) scheme through data sharing and a coordinated scheduling scheme/beamforming (CS/CB) scheme.

As described above, although the CoMP system will be introduced in the next generation communication system, 3GPP LTE-A, a detailed method for inter-cell interference cooperation among multiple cells has not been suggested until now.

DISCLOSURE

Technical Problem

An object of the present invention devised to solve the conventional problem is to provide a method for performing CoMP (Coordinated Multiple Point) communication using a precoded sounding reference signal.

Another object of the present invention is to provide an apparatus for performing CoMP communication using a precoded sounding reference signal.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, a method for performing a coordinated multi-point (CoMP) communication using a precoded sounding reference signal comprises: receiving, at a base station, from a user equipment of a neighboring cell, a sounding reference signal (SRS) precoded by a first matrix $U_C$; acquiring an effective neighboring channel matrix using a hermitian matrix of the first matrix from the received SRS and a downlink channel matrix $H_{CC}$ between the user equipment and the base station; and determining a precoding matrix to be transmitted to one or more user equipments served by the base station on the basis of the effective neighboring channel matrix, wherein the effective neighboring channel matrix indicates a direction toward which a receiving beam is directed for data reception of the user equipment from a serving base station.

The method further comprises acquiring CoMP scheduling information of the user equipment from the received SRS, wherein the determining a precoding matrix includes determining a precoding matrix to be transmitted for one or more user equipments having a time or frequency overlapped with a time or frequency resource scheduled for the user equipment, wherein the one or more user equipments is served by the base station.

The determined precoding matrix exists in a null space of the effective neighboring channel.

The first matrix $U_C$ corresponds to a precoding matrix determined by the user equipment for application to the SRS on the basis of a precoding matrix $P_{SC}$ determined by the serving base station, and the effective neighboring channel matrix may be expressed by multiplication of the hermitian matrix $U_C^H$ of the first matrix and the downlink channel matrix $H_{CC}$ between the user equipment and the base station.

The SRS may be transmitted through a pre-reserved time or frequency resource.

To solve the aforementioned technical problems, a method for performing a coordinated multi-point (CoMP) communication using a precoded sounding reference signal comprises: transmitting a non-precoded sounding reference signal to a serving base station; receiving, a precoding matrix used for data transmission to the user equipment by the serving base station, from the serving base station; and determining a receiving matrix on the basis of the received precoding matrix; and precoding a hermitian matrix of the determined receiving matrix to the SRS and transmitting the precoded SRS to a neighboring base station.

The method further comprises the step of receiving SRS configuration information of the user equipment from the serving base station, wherein the user equipment transmits the SRS on the basis of the received SRS configuration information.

The precoding matrix determined by the serving base station may be determined on the basis of downlink channel estimation between the user equipment and the base station by using the sounding reference signal received by the serving base station from the user equipment.

To solve the aforementioned technical problems, a base station for performing a coordinated multi-point (CoMP) communication using a precoded sounding reference signal comprises a receiver receiving a sounding reference signal (SRS) preceded by a first matrix $U_C$ from a user equipment of a neighboring cell; and a processor acquiring an effective neighboring channel matrix using a hermitian matrix of the first matrix from the received SRS and a downlink channel matrix $H_{CC}$ between the user equipment and the base station, and determining a precoding matrix to be transmitted to one or more user equipments served by the base station on the basis of the effective neighboring channel matrix, wherein the effective neighboring channel matrix indicates a direction toward which a receiving beam is directed for data reception of the user equipment from a serving base station.

The processor further acquires CoMP scheduling information of the user equipment from the received SRS, and may determine a precoding matrix to be transmitted for one or more user equipments having a time or frequency overlapped with a time or frequency resource scheduled for the user equipment, wherein the one or more user equipments is supported by the base station, on the basis of the acquired scheduling information.

The precoding matrix determined by the processor may exist in a null space of the effective neighboring channel.

To solve the aforementioned technical problems, a user equipment for performing a coordinated multi-point (CoMP) communication using a precoded sounding reference signal comprises a transmitter transmitting a non-precoded sounding reference signal to a serving base station; a receiver receiving a precoding matrix used for data transmission to the user equipment by the serving base station from the serving base station; a processor determining a receiving matrix on the basis of the received precoding matrix and precoding a hermitian matrix of the determined receiving matrix to the SRS; and a transmitter transmitting the precoded SRS to a neighboring base station.

The user equipment further comprises a receiver receiving SRS configuration information of the user equipment from the serving base station, wherein the transmitter transmitting the SRS transmits the SRS on the basis of the received SRS configuration information.

Advantageous Effects

According to various embodiments of the present invention, inter-cell interference caused in a user equipment located at the cell edge may be removed and reduced, whereby communication throughput of the user equipment may be improved remarkably.

Also, according to the present invention, inter-cell interference may be removed on the basis of SRS signal transmission, whereby communication throughput may be prevented from being deteriorated due to delay caused by excessive information sharing through a backhaul link.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating structures of downlink and uplink subframes in a 3GPP LTE system which is an example of a mobile communication system;

FIG. 9 is a diagram illustrating an example of SRS transmission of a non-precoded full rank;

FIG. 10 is a diagram illustrating an example of SRS transmission of a precoded full rank;

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP LTE system, the following description may be applied to other mobile communication systems except for unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment means a mobile or fixed type user terminal such as a mobile station (MS) and an advanced mobile station (AMS). It is also assumed that a base station means a random node of a network node, such as Node B, eNode B and an access point (AP), which performs communication with a user equipment.

In the mobile communication system, a user equipment/relay node may receive information from a base station through a downlink/backhaul downlink. Also, the user equipment/relay node may transmit information through an uplink/backhaul uplink. Examples of information transmitted from and received by the user equipment include data and various kinds of control information. Various physical channels exist depending on types of information transmitted from or received by the user equipment.

Although one base station 105, one user equipment 110 are shown for simplification of a wireless communication system 100, the wireless communication system 100 may include one or more base stations and/or one or more user equipments. In other words, examples of the base station 105 include various types of base stations such as a macro base station and a femto base station, which are described in the present invention, and example of the user equipment 110 include various types of user equipments such as a macro user equipment and a femto user equipment.

Figure 1:
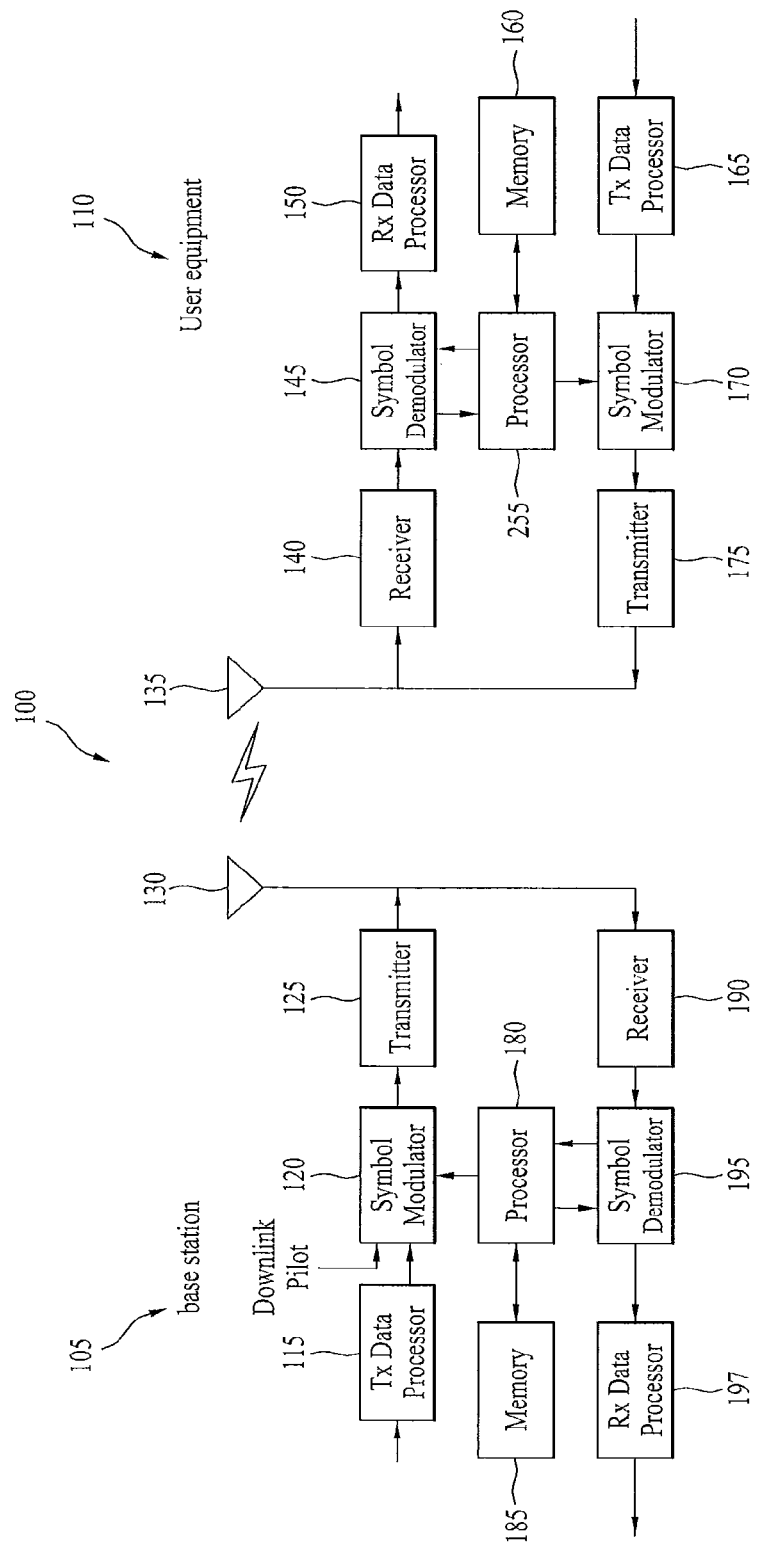
FIG. 1 is a block diagram illustrating a configuration of a base station 105 and a user equipment 110 in a wireless communication system 100.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The user equipment 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. The base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the user equipment through the antenna 120.

In the configuration of the user equipment 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

Figure 2:
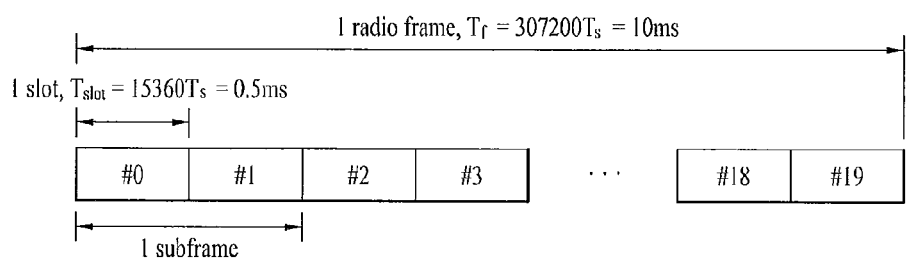
FIG. 2 is a diagram illustrating a structure of a radio frame used in a 3GPP LTE system which is an example of a mobile communication system.

FIG. 2 is a diagram illustrating a structure of a radio frame used in a 3GPP LTE system which is an example of a mobile communication system.

Referring to FIG. 2, one radio frame has a length of 10 ms ($327200 \times T_s$) and includes ten (10) subframes of an equal size. Each sub frame has a length of 1ms and includes two slots. Each slot has a length of 0.5 ms ($15360T_s$). In this case, $T_s$ represents a sampling time, and is expressed by $T_s=1/(15 kHz \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain.

In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

FIG. 3 is a diagram illustrating structures of downlink and uplink subframes in a 3GPP LTE system which is an example of a mobile communication system.

Referring to (a) of FIG. 3, one downlink subframe includes two slots in a time domain. Maximum three OFDM symbols located at the front of the first slot within one downlink subframe correspond to a control region to which control channels are allocated. The other OFDM symbols correspond to a data region to which a physical downlink shared channel (PDSCH) is allocated.

Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH transmitted from the first OFDM symbol of the subframe carries information on the number (that is, size of control region) of OFDM symbols used for transmission of the control channels within the subframe. The control information transmitted through the PDCCH will be referred to as downlink control information (DCI). The DCI includes uplink resource allocation information, downlink resource allocation information, and uplink transmission (Tx) power control command for random user equipment groups. The PHICH carries ACK/NACK (acknowledgement/negative-acknowledgement) signals in response to uplink HARQ (Hybrid Automatic Repeat Request). In other words, the ACK/NACK signal for the uplink data transmitted from the user equipment is transmitted on the PHICH.

Now, the PDCCH will be described.

The base station may transmit a resource allocation and transport format (this may be referred to as DL grant) of the PDSCH, resource allocation information (this may be referred to as UL grant) of the PUSCH, aggregation of transmission power control commands for individual user equipments within a random user equipment group, and activity information of voice over Internet protocol (VoIP) through the PDCCH. A plurality of PDCCHs may be transmitted within the control region. The user equipment may monitor the plurality of PDCCHs. The PDCCH is configured by aggregation of one or a plurality of continuous control channel elements (CCEs). The PDCCH of one or aggregation of several continuous CCEs may be transmitted through the control region after subblock interleaving. The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCEs.

The control information transmitted through the PDCCH is referred to as downlink control information (DCI). The following Table 1 illustrates DCI based on a DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

The DCI format 0 represents uplink resource allocation information, the DCI formats 1 and 2 represent downlink resource allocation information, and the DCI formats 3 and 3A represent uplink transmit power control (TPC) command for random user equipment groups.

A method for mapping a resource for PDCCH transmission in a base station of the LTE system will be described in brief.

Generally, the base station may transmit scheduling allocation information and other control information through the PDCCH. The physical control channel may be transmitted to one aggregation or a plurality of continuous control channel elements (CCEs). One CCE includes nine resource element groups (REGs). The number of resource element groups (RBGs) which are not allocated to a physical control format indicator channel (PCFICH) or a physical hybrid automatic repeat request indicator channel (PHICH) is $N_{REG}$. The CCEs available in the system are from 0 to $N_{CCE}-1$ (in this case, $N_{CCE}=\lfloor N_{REG}/9 \rfloor$). The PDCCH supports multiple formats as expressed in Table 2 below. One PDCCH that includes n continuous CCEs starts from CCE that performs i mod n=0 (in this case, i is a CCE number). The multiple PDCCHs may be transmitted to one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the base station may determine a PDCCH format depending on how many regions control information are transmitted. The user equipment may reduce overhead by reading out control information in a unit of CCE. Likewise, the relay node may read out the control information in a unit of CCE. In the LTE-A system, a resource element (RE) may be mapped in a unit of relay-control channel element (R-CCE) to transmit R-PDCCH for a random relay node.

Referring to (b) of FIG. 3, the uplink subframe may be divided into a control region and a data region on a frequency domain. A physical uplink control channel (PUCCH), which carries uplink control information, is allocated to the control region. A physical uplink shared channel (PUSCH), which carries user data, is allocated to the data region. In order to maintain single carrier features, one user equipment does not transmit the PUCCH and the PUSCH at the same time. The PUCCH for one user equipment is allocated to resource block (RB) pair at one subframe. Resource blocks (RBs) belonging to the RB pair occupy different subcarriers for two slots. The RB pair allocated to the PUCCH is subjected to frequency hopping at a slot boundary.

Figure 4:
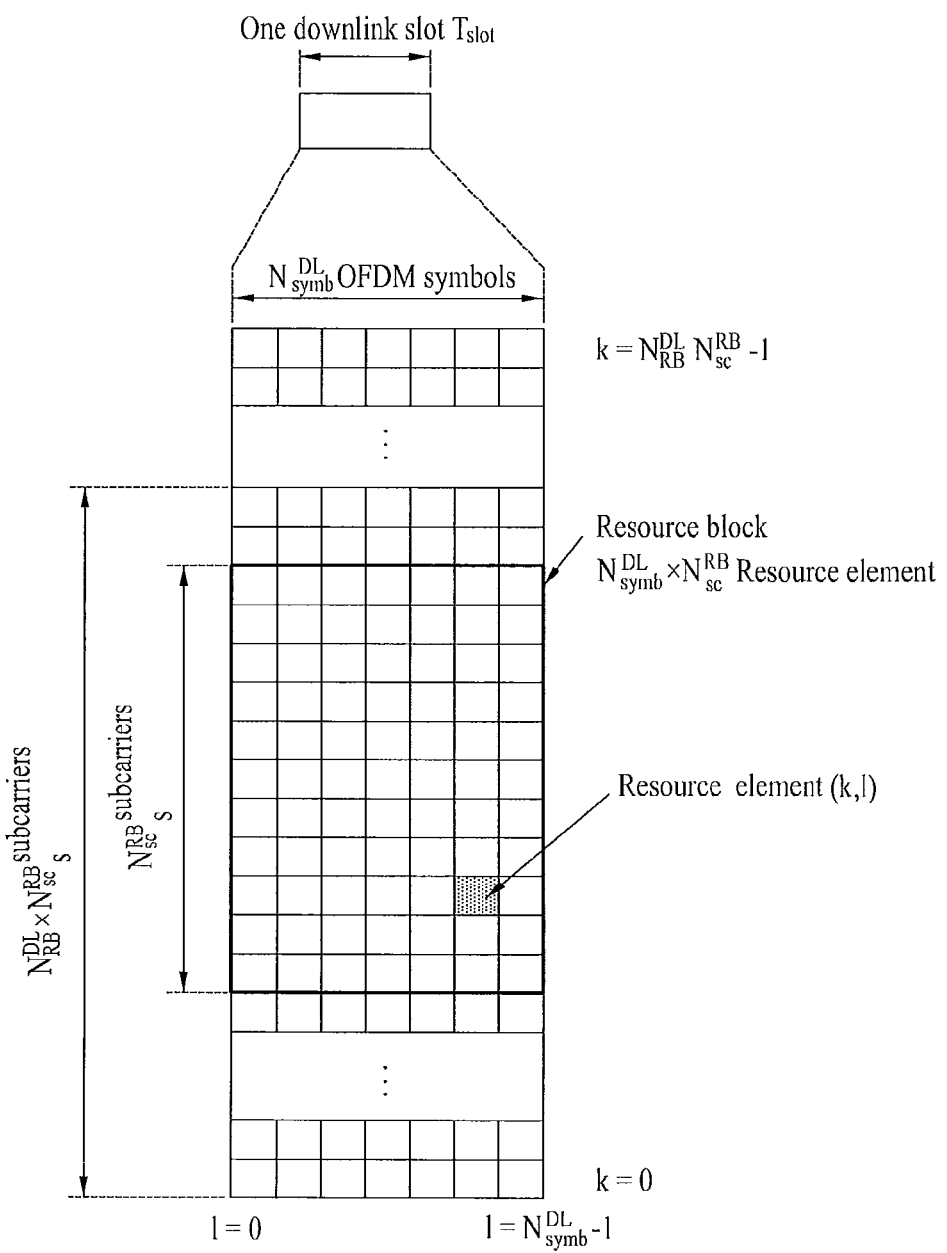
FIG. 4 is a diagram illustrating a time-frequency resource grid structure of a downlink used in the present invention.

FIG. 4 is a diagram illustrating a time-frequency resource grid structure of a downlink slot used in the present invention.

A downlink signal transmitted from each slot may be expressed by a resource grid, which includes $N_{RB}^{DL} \times N_{sc}^{RB}$ number of subcarriers and $N_{symb}^{DL}$ number of OFDM (orthogonal frequency division multiplexing) symbols. In this case, $N_{RB}^{DL}$ represents the number of resource blocks (RBs) in the downlink, $N_{sc}^{RB}$ represents the number of subcarriers that constitute one resource block (RB), and $N_{symb}^{DL}$ represents the number of OFDM symbols at one downlink slot. The size of $N_{RB}^{DL}$ may be varied depending on a downlink transmission bandwidth configured within a cell and should satisfy $N_{RB}^{min,DL} \leq N_{RB}^{DL} \leq N_{RB}^{max,DL}$. In this case, $N_{RB}^{min,DL}$ is the smallest downlink bandwidth supported by the wireless communication system, and $N_{RB}^{max,DL}$ is the greatest downlink bandwidth supported by the wireless communication system. Although $N_{RB}^{min,DL}=6$ and $N_{RB}^{max,DL}=110$ may be provided, the present invention is not limited to this example. The number of OFDM symbols included in one slot may be varied depending on a length of cyclic prefix (CP) and interval of the subcarriers. In case of MIMO antenna transmission, one resource grid may be defined per one antenna port.

Each element within the resource grid for each antenna port is referred to as a resource element (RE), and is uniquely identified by a pair of indexes (k,l) within the slot. In this case, k is an index in the frequency domain, l is an index in the time domain. Also, k has any one value of $0, \ldots, N_{RB}^{DL} N_{sc}^{RB}-1$, and l has any one value of $0, \ldots, N_{symb}^{DL}-1$.

The resource block shown in FIG. 4 is used to describe the mapping relation between a physical channel and resource elements. The RB may be divided into a physical resource block (PRB) and a virtual resource block (VRB). The one physical resource block is defined by $N_{symb}^{DL}$ continuous OFDM symbols in the time domain and $N_{sc}^{RB}$ continuous subcarriers in the frequency domain. In this case, $N_{symb}^{DL}$ and $N_{sc}^{RB}$ may be the values previously defined. For example, $N_{symb}^{DL}$ and $N_{sc}^{RB}$ may be given as illustrated in Table 3 below. Accordingly, one PRB includes $N_{symb}^{DL} \times N_{sc}^{RB}$ number of resource elements. One PRB corresponds to, but not limited to, one slot in the time domain, and corresponds to, but not limited to, 180 kHz in the frequency domain.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 15 kHz | 24 | 3 |

The PRB has values from 0 to $N_{RB}^{DL}-1$ in the frequency domain. The relation between the physical resource block number $n_{PRB}$ and resource elements (k,l) within one slot satisfies $$n_{PRB} = \left\lfloor \frac{k}{N_{sc}^{RB}} \right\rfloor.$$

The virtual resource block (VRB) has the same size as that of the physical resource block (PRB). The VRB may be divided into a localized virtual resource block (LVRB) and a distributed virtual resource blocks (DVRB). For each VRB, a pair of VRBs in two slots within one subframe are allocated together with a single virtual resource block number $n_{VRB}$.

The VRB may have the same size as that of the PRB. Two types of VRBs are defined, wherein the first type is the localized VRB (LVRB) and the second type is the distributed VRB (DVRB). For each VRB, a pair of VRBs are allocated to two slots of one subframe together with a single VRB index (hereinafter, referred to as VRB number). In other words, $N_{RB}^{DL}$ number of VRBs belonging to the first slot of two slots constituting one subframe are allocated with any one index of 0 to $N_{RB}^{DL}-1$, $N_{RB}^{DL}$ number of VRBs belonging to the second slot are allocated with any one index of 0 to $N_{RB}^{DL}-1$.

Hereinafter, the general MIMO technology will be described. MIMO is abbreviated from "multi-input multi-output", and means a system that enhances transmission and reception efficiency of data by using multiple transmitting antennas and multiple receiving antennas instead of one transmitting antenna and one receiving antenna used until now. In other words, the MIMO technology is intended to increase capacity or improve throughput by using multiple antennas in a transmitter or receiver of a wireless communication system. Hereinafter, "MIMO" will be referred to as "multiple antennas".

The MIMO antenna technology is based on the technology that receives a whole message by incorporating data fragments received from a plurality of antennas into one without depending on a signal antenna path. According to the MIMO antenna technology, a data transmission rate may be improved within a specific range, or system coverage may be enhanced with a specific data transmission rate.

Since the next generation mobile communication requires a data transmission rate higher than that of the existing mobile communication, it is expected that the efficient MIMO antenna technology will be required necessarily. Under the circumstances, the MIMO communication technology may widely be used for a user equipment for mobile communication and a relay node, and has received attention as the technology that may overcome limitation of a transmission rate in mobile communication varied depending on limitation situation caused by data communication expansion, etc.

In the mean time, among various technologies for improvement of transmission efficiency, which are currently studied, the MIMO technology that uses multiple antennas in both a transmitter and a receiver has currently received the greatest attention as a method for remarkably improving communication capacity and transmission and reception throughput without additional frequency allocation or power increase.

Figure 5:
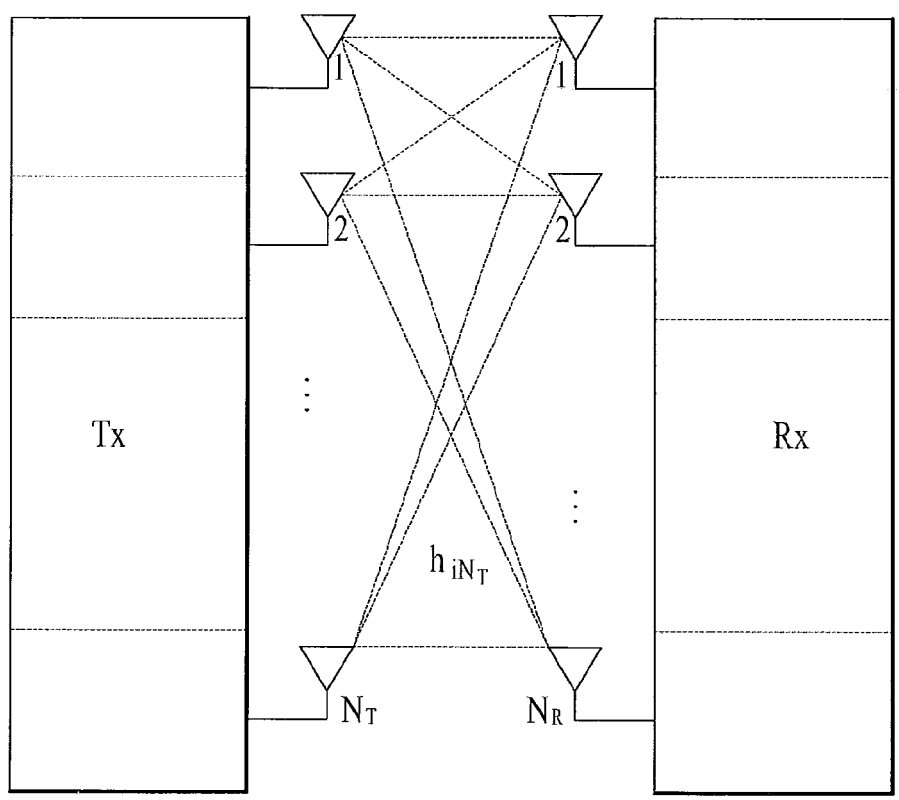
FIG. 5 is a schematic diagram of a general MIMO communication system.

FIG. 5 is a schematic view illustrating a general MIMO communication system.

As shown in FIG. 5, if the number of transmitting antennas increases to $N_T$ and the number of receiving antennas increases to $N_R$, channel transmission capacity increases theoretically in proportion to the number of antennas unlike that a plurality of antennas are used in only a transmitter or receiver. Accordingly, it is possible to improve a transmission rate and remarkably improve frequency efficiency. A transmission rate based on increase of channel transmission capacity may increase theoretically as much as a value obtained by multiplying a maximum transmission rate $R_O$, which corresponds to a case where one antenna is used, by an increase rate $R_i$, as follows.

$$R_i = \min(N_T, N_R) \quad \text{[Equation 1]}$$

A communication method in the aforementioned MIMO system will be described in more detail with reference to mathematical modeling as follows.

First of all, as shown in FIG. 5, it is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is multiplied by an information vector of which transmission power is controlled, whereby $N_T$ transmitting signals $x_1, x_2, \ldots, x_{N_T}$, which are actually transmitted, are obtained. In this case, the weight matrix W serves to properly distribute the transmission information to each antenna in accordance with the transmission channel status. Such transmitting signals $x_1, x_2, \ldots, x_{N_T}$ may be expressed as follows using a vector X.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In the above Equation 5, $w_{ij}$ means a weight value between the ith transmitting antenna and the jth information, and W means a matrix expressed by the weight value. This matrix W may be referred to as a weight matrix or a precoding matrix.

Meanwhile, the aforementioned transmitting signal x may be divided into a case where spatial diversity is used and a case where spatial multiplexing is used.

Since different signals are multiplexed and transmitted in case of spatial multiplexing, elements of the information vector s have their respective values different from one another. On the other hand, since the same signal is transmitted through several channel paths in case of spatial diversity, the elements of the information vector s have the same value as one another.

It may be considered a hybrid method of spatial multiplexing and spatial diversity. In other words, it may be considered that the same signal is transmitted using spatial diversity through three transmitting antennas and the other signals are transmitted using spatial multiplexing. Next, if there exist $N_R$ receiving antennas, receiving signals $y_1, y_2, \ldots, y_{N_R}$ of the respective antennas may be expressed by a vector y as follows.

$$y = [y_1, y_2, \ldots, y_{N_R}]^T \quad \text{[Equation 6]}$$

Meanwhile, in case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$. These channels may be grouped into one to express a vector type or a matrix type. The vector type may be expressed as follows.

Figure 6:
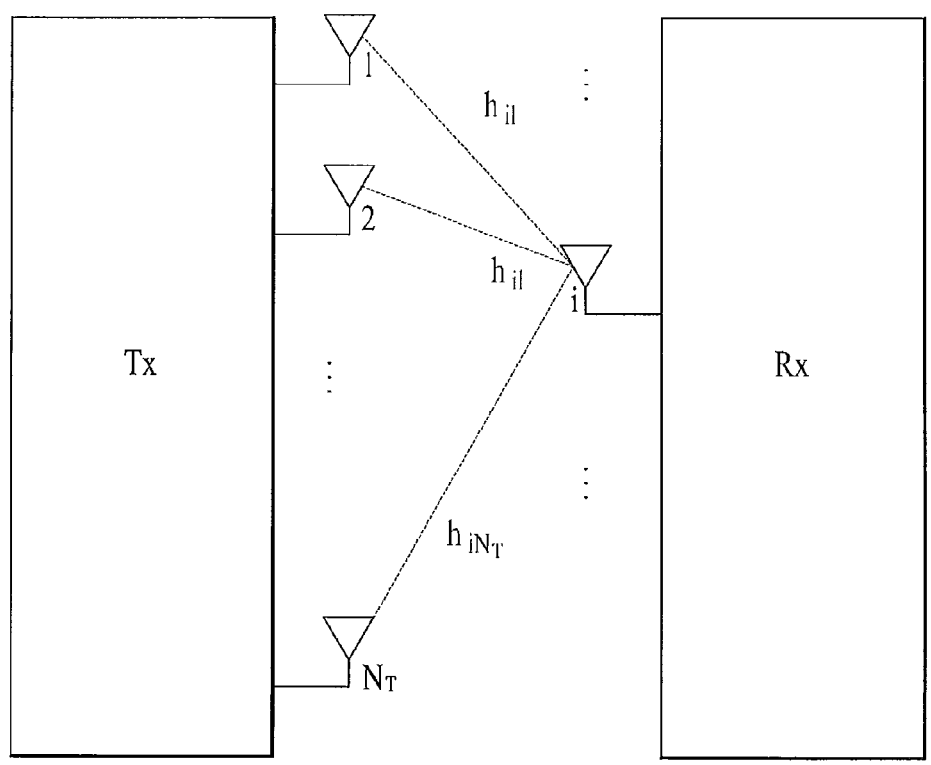
FIG. 6 is a diagram illustrating a channel from $N_T$ transmitting antennas to a receiving antenna i.

FIG. 6 illustrates channels from $N_T$ transmitting antennas from the receiving antenna i.

As shown in FIG. 6, the channels from $N_T$ transmitting antennas to the ith receiving antenna may be expressed as follows.

$$h_i^T = [h_{i1}, h_{i2}, \ldots, h_{iN_T}] \quad \text{[Equation 7]}$$

Also, all channels from $N_T$ transmitting antennas to $N_R$ receiving antennas through the matrix type of the Equation 7 may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Meanwhile, since additive white Gaussian noise (AWGN) is actually added to the channels after the above channel matrix H. AWGN added to each of the $N_R$ receiving antennas may be expressed by a vector as follows.

$$n = [n_1, n_2, \ldots, n_{N_r}]^T$$ [Equation 9]

The aforementioned transmitting signals, receiving signals, channels and AWGN may be expressed in the MIMO communication system through their modeling as follows.

$$y = \begin{bmatrix} y_1 \\ y_2 \\ \vdots \\ y_i \\ \vdots \\ y_{W_R} \end{bmatrix}$$ [Equation 10]

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the mean time, the number of rows and columns of the channel matrix H indicating the channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

Generally, a rank of the matrix is defined by a minimum number of the number of rows and the number of columns, which are independent from each other. Therefore, the rank of the matrix cannot have a value greater than the number of rows or the number of columns. Rank (rank(H) of the channel matrix H may be limited as follows.

$$\text{rank}(H) \leq \min(N_T, N_R)$$ [Equation 11]

Hereinafter, a reference signal (RS) transmitted and received between the transmitter and the receiver in the wireless communication system will be described.

In the wireless communication system, when the transmitter transmits a packet (or signal) to the receiver, since the packet is transmitted through a radio channel, signal distortion may occur during transmission of the packet. In order to normally receive the distorted signal, the receiver may discover channel information and compensate for distortion of the received signal as much as the channel information. In order to discover the channel information, it is required to transmit the signal known by both the transmitter and the receiver. In other words, the receiver discovers the channel information using a distortion level of the signal when the signal is received through the channel. At this time, the signal known by both the transmitter and the receiver will be referred to as a reference signal or a pilot signal.

According to the related art, when the transmitter transmits a packet to the receiver, one transmitting antenna and one receiving antenna have been used. However, most of wireless communication systems have recently adopted multiple transmitting antennas and multiple receiving antennas to improve transmission and reception data efficiency. If the transmitter or receiver of the wireless communication system transmits or receives data by using multiple antennas to increase capacity and improve communication throughput, a separate reference signal exists per transmitting antenna. The receiver may receive the signal transmitted from each transmitter by using the reference signal per transmitting antenna.

In the wireless communication system, the reference signal may be divided into two types depending on its purpose of use. Namely, examples of the reference signal include a reference signal intended for acquisition of channel information and a reference signal intended for data demodulation. Since the former reference signal is intended for acquisition of channel information on the downlink, it needs to be transmitted through a broad band. Also, the former reference signal should be received and measured even by a user equipment that does not receive downlink data for a specific subframe. Also, this reference signal for channel measurement may also be used for measurement of handover. The latter reference signal is transmitted from the base station together with a corresponding resource when the base station transmits a downlink signal. In this case, the user equipment may perform channel estimation by receiving the corresponding reference signal, whereby the user equipment may demodulate the downlink data. This reference signal for demodulation should be transmitted to a region where data are transmitted.

Figure 7:
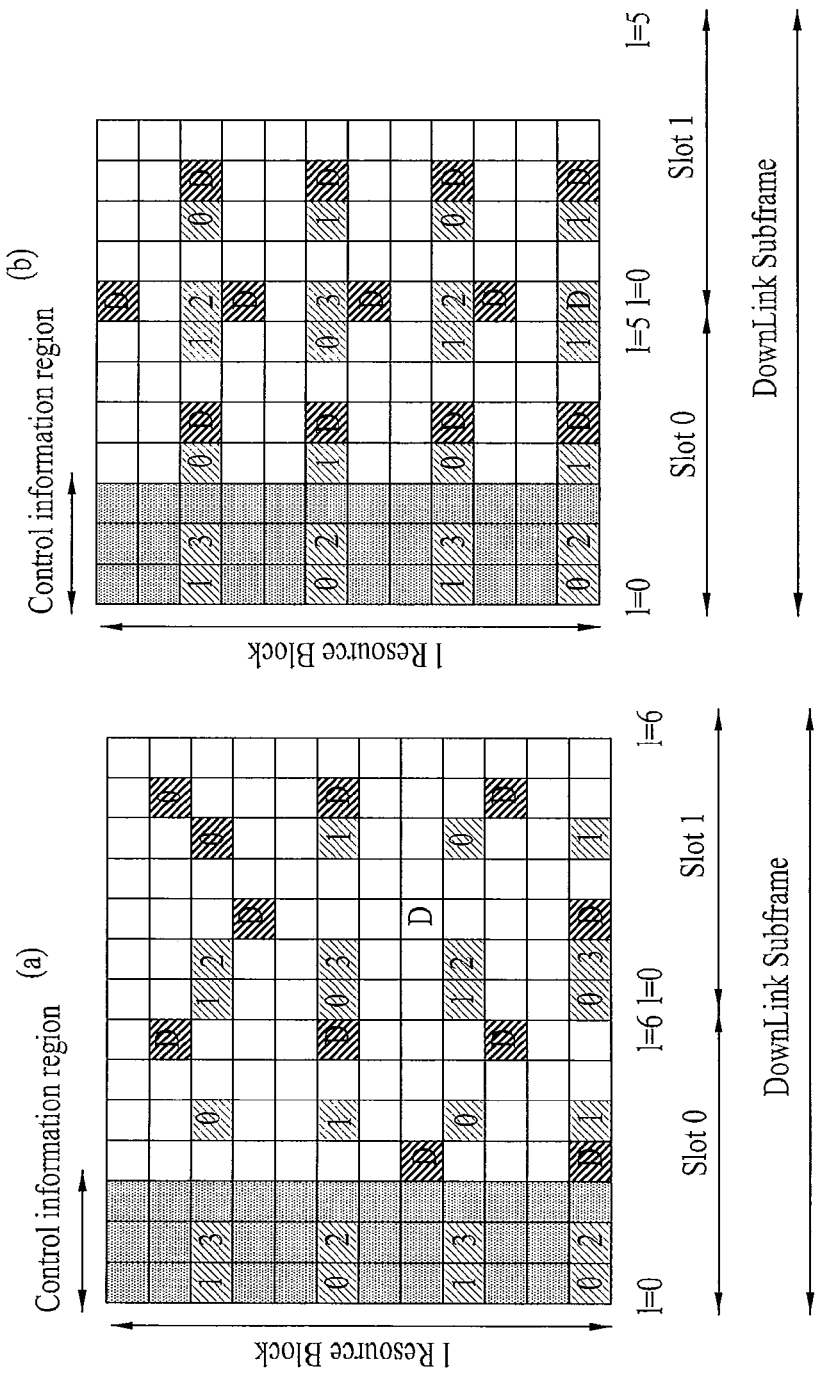
FIG. 7 is a diagram illustrating a reference signal pattern in a 3GPP LTE system which is an example of a mobile communication system.

FIG. 7 is a diagram illustrating a reference signal pattern in a 3GPP LTE system which is an example of a wireless communication system.

(a) FIG. 7 (a) illustrates a reference signal pattern when a normal cyclic prefix (CP) is used, and FIG. 7 (b) illustrates a reference signal pattern when an extended CP is used.

In the Release 8 LTE system, which is an example of a wireless communication system, two types of downlink reference signals are defined for unicast service. There are provided two types of reference signals, i.e., a common reference signal (CRS) for acquisition of channel status information and measurement of handover and a dedicated reference signal (DRS) (corresponding to a user equipment-specific reference signal (UE-specific RS)) for data demodulation. In the Release 8 LTE system, the user equipment-specific reference signal is only used for data demodulation, and the CRS is used for both acquisition of channel information and data demodulation. The CRS is a cell-specific reference signal, and is transmitted by the base station per subframe through a broad band. The cell-specific CRSs for maximum four antenna ports are transmitted depending on the number of transmitting antennas of the base station.

As shown in FIG. 7 (a) and (b), the CRS (1, 2, 3 and 4 represent reference signals R0, R1, R2 and R3 per antenna port) for four antenna ports are allocated such that time-frequency resources are not overlapped in one resource block (RB). When the CRS map into the time-frequency resources in the LTE system, the reference signal for one antenna port is mapped into one RB per six RE on the frequency axis. Since one RB includes twelve REs on the frequency axis, two REs for one antenna port are used per one RB.

As shown in FIG. 7 (a) and (b), the DRS ("D") is supported for single-antenna port transmission of the PDSCH. The user equipment may receive information as to whether the user equipment-specific RS exists, from its upper layer. If data demodulation is required, the user equipment-specific RS is transmitted to the user equipment through the resource element. Meanwhile, an RS mapping rule to the resource block may be expressed by the following Equations 12 to 14. The following Equation 12 is to express a CRS mapping rule, the following Equation 13 is to express a mapping rule of the DRS to which normal CP is applied, and the following Equation 14 is to express a mapping rule of the DRS to which extended CP is applied.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3 N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 6 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4 N_{RB}^{PDSCH} - 1$$

$$v_{shift} = N_{ID}^{cell} \bmod 3$$

In the above Equations 12 to 14, k and p represent a subcarrier index and an antenna port index, respectively. $N_{RB}^{DL}$, $n_s$ and $N_{ID}^{cell}$ represent the number of RBs allocated to the downlink, the number of slot indexes, and the number of cell IDs, respectively. A position of the RS is varied depending on a value of $V_{shift}$ in view of the frequency domain.

It is expected that the LTE-A system, which is the standard of the next generation wireless communication system, will support a coordinated multi point (CoMP) system and a multi user-MIMO (MU-MIMO) system, which have not been supported by the existing standard, so as to improve a data transmission rate. In this case, the CoMP system means that two or more base stations or cells perform communication with a user equipment by coordinating with each other to improve communication throughput between the base station (cell or sector) and the user equipment located in a shaded zone.

Examples of the CoMP system may include a coordinated MIMO type joint processing (CoMP-JP) system through data sharing and a CoMP-coordinated scheduling/beamforming (CoMP-CS) system.

In case of the down link, according to the joint processing (CoMP-JP) system, the user equipment may simultaneously receive data from each base station that performs CoMP, and may improve receiving throughput by combining the signals received from each base station. Unlike this joint processing system, according to the coordinated scheduling/beamforming (COMP-CS) system, the user equipment may momentarily receive data through beamforming from one base station.

In case of the uplink according to the joint processing (COMP-JP) system, each base station may simultaneously receive the PUSCH signal from the user equipment. Unlike this joint processing system, according to the coordinated scheduling/beamforming (CoMP-CS) system, only one base station may receive the PUSCH signal. At this time, coordinated cells (or base stations) determine to use the coordinated scheduling/beamforming (CoMP-CS) system.

The MU-MIMO system means that the base station allocates each antenna resource to different user equipments, and is to perform scheduling by selecting a user equipment that enables a high data transmission rate per antenna. This MU-MIMO system is to improve system throughput.

Figure 8:
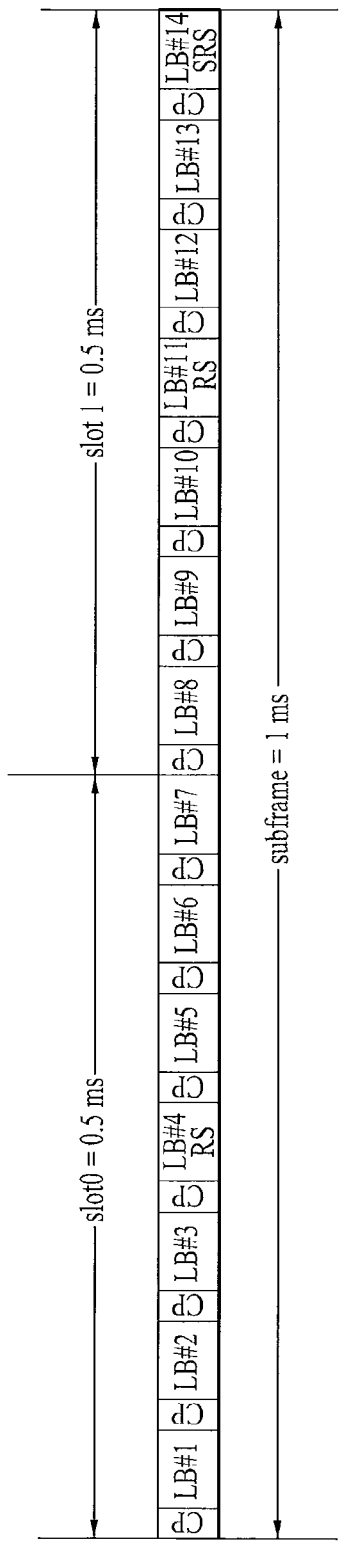
FIG. 8 is a diagram illustrating an example of an uplink subframe structure that includes SRS symbols.

FIG. 8 is a diagram illustrating an example of an uplink subframe structure that includes SRS symbols.

Referring to FIG. 8, a sounding reference signal (SRS) has no relation with transmission of control information and/or uplink data, and is mainly used to evaluate channel quality, whereby frequency-selective scheduling can be performed on the uplink. However, the SRS may be used to provide various functions to a user equipment, which is not scheduled recently, or may be used to improve power control. The SRS is a reference signal used for uplink channel measurement and as a pilot signal transmitted from each user equipment to the base station, is used by the base station to estimate a channel status from each user equipment to the base station. The channel that transmits the SRS may have different transmission bandwidths and different transmission periods for each user equipment in accordance with the status of each user equipment. The base station may determine a user equipment of which data channel should be scheduled per subframe, on the basis of the channel estimation result.

On the assumption that the radio channel is reciprocal between the uplink and the downlink, the SRS may be used to estimate downlink channel quality. This assumption is useful in a time division duplex (TDD) system in which the uplink and the downlink share the same frequency domain and are separated from each other in the time domain. The subframe for which the SRS is transmitted by the user equipment within the cell is indicated by cell-specific broadcast signaling. A 4-bit sized cell-specific 'srsSubframeConfiguration' parameter indicates 15 available subframe sets for which the SRS may be transmitted within each radio frame. This structure provides flexibility in controlling SRS overhead. As shown in FIG. 8, the user equipment may transmit the SRS through the last SC-FDMA symbol for the subframe.

Accordingly, the SRS and the demodulation-reference signal (DM-RS) are located at their respective SC-FDMA symbol positions different from each other for the subframe. The sounding reference signals of several user equipments, which are transmitted to the last SC-FDMA of the same subframe, may be identified depending on the frequency position. Since PUSCH data of the user equipment are not transmitted through the SC-FDMA symbol designed for the SRS, SRS symbol is provided per subframe in the worst case, whereby sounding overhead of 7% may occur.

The SRS is generated by constant amplitude zero auto correlation (CAZAC) sequences, and the sounding reference signals transmitted from several user equipments are CAZAC sequences $r^{SRS}(n) = r_{u,v}^{(\alpha)}(n)$ having different cyclic shift values $\alpha$ based on the following Equation 15. In this case, $r^{SRS}(n)$ is the SRS sequence.

$$\alpha = 2\pi \frac{n_{SRS}^{cs}}{8} \quad \text{[Equation 15]}$$

In this case, $n_{SRS}^{cs}$ is set for each user equipment by the upper layer, and has an integer value between 0 and 7. The CAZAC sequences generated from one CAZAC sequence through cyclic shift have zero-correlation values with the other sequences having their respective cyclic shift values different from one another. The SRSs in the same frequency domain may be identified in accordance with the CAZAC sequence shift values by using the zero-correlation feature. The SRS of each user equipment is allocated on the frequency in accordance with the parameter set by the base station. The user equipment performs frequency hopping of the sounding reference signal to transmit the SRS to the full uplink data transmission bandwidth.

FIG. 9 is a diagram illustrating an example of SRS transmission of a non-precoded full rank.

Referring to FIG. 9, a user equipment having $N_{UE}$ number of antennas may transmit SRS of a non-precoded full rank to the serving base station to estimate the entire channel status. To this end, SRSs of different antenna ports may be identified by different SRS transmission resources. In other words, the SRS of each antenna is divided into time and sequence, whereby a total of $N_{UE}$ number of SRSs may be transmitted.

Unlike FIG. 9, a method for performing CoMP operation based on a precoded SRS will be described in the present invention. In a CoMP operation set (that is, base stations (or cells or sectors) involved in CoMP cooperative operation), SRS transmission features depend on SRS receiving points (that is, receiving base stations). Examples of the SRS transmission features include the time for transmitting SRS from the user equipment, position and resource rate of SRS resources used for SRS transmission by the user equipment, the number of antenna ports used for SRS transmission, and a precoding matrix used for SRS transmission by the user equipment.

According to one embodiment of the present invention, a CoMP user equipment that performs CoMP operation may transmit a non-precoded full rank SRS to the serving base station so that the serving base station may easily perform channel estimation. Meanwhile, the CoMP user equipment transmits a properly precoded SRS to notify a coordinating eNB of a direction of a desired signal of the user equipment, wherein the desired signal is transmitted from the serving base station.

According to another embodiment of the present invention, some (some layers corresponding to layers of PUSCH transmission) of precoded SRS layers may be received by both the serving base station and the coordinating eNB (or neighboring base station) by using the SRS resources. At this time, all the SRS resources used in the cell are orthogonal. Meanwhile, the other SRS layers are received by the serving base station only. In this embodiment, the user equipment provides the serving base station with full rank SRS information but may transmit channel direction information only to the coordinating eNB.

FIG. 10 is a diagram illustrating an example of SRS transmission of a precoded full rank.

Referring to FIG. 10, each SRS is precoded by a precoding matrix $[P_1, P_2, \ldots, P_{N_{R\text{-}SRS}}]^T$, and a signal $N_{R\text{-}SRS}$ is transmitted from the full rank. In this case, $P_n = [P_{n,1}, P_{n,2}, \ldots, P_{n,N_{UES}}]^T$ is a precoding vector of the nth SRS layer. The number of SRS layers of precoded SRS is equal to or smaller than the number of antennas of the user equipment (that is, $N_{R\text{-}SRS} \leq N_{UE}$).

Figure 11:
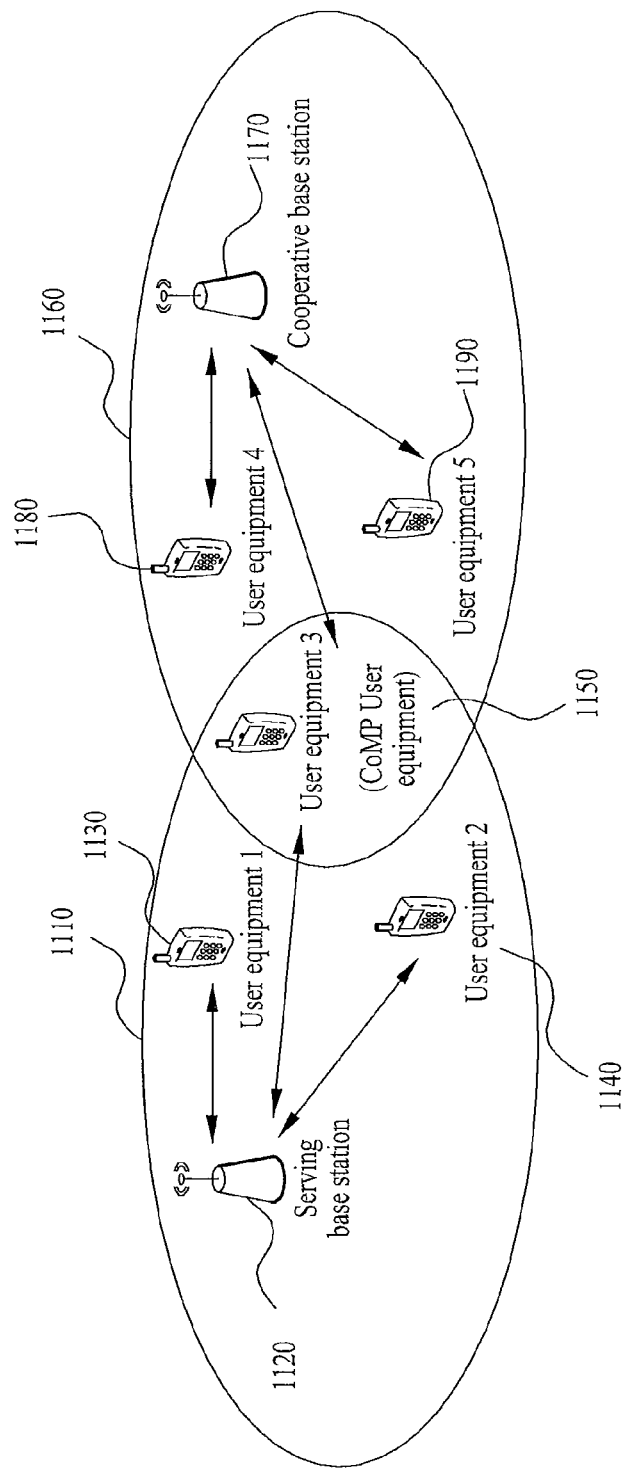
FIG. 11 is a diagram illustrating a concept of cooperative operation of CoMP cooperative base stations.

FIG. 11 is a diagram illustrating a concept of cooperation operation of CoMP cooperative base stations.

The CoMP cooperative base stations mean the base stations that perform CoMP operation in the downlink and/or the uplink to remove inter-cell interference between neighboring cells. Two CoMP cooperative base stations (or cells) are shown in FIG. 11. One CoMP cooperative base station is the serving base station 1120 that controls transmission/reception of the CoMP user equipment that performs the CoMP operation, and the other CoMP cooperative base station is the cooperative base station 1170 that controls its transmission and reception in cooperative with the serving base station. Although two CoMP cooperative base stations are shown in FIG. 11 for convenience of description, the number of CoMP cooperative base stations is not limited to two and may be increased to two or more.

Hereinafter, as shown in FIG. 11, the CoMP cooperative operation between the user equipment and the CoMP cooperative base stations will be described.

First Embodiment of Downlink Cole

Downlink channel information may be acquired by reciprocity between channels through SRS transmission/reception. In this case, since channel information is not required to be exchanged between the CoMP cooperative base stations, the downlink CoMP CS/CB may be implemented easily in the present invention. Hereinafter, a procedure for the CoMP CS/CB operation on the downlink will be described.

Figure 12:
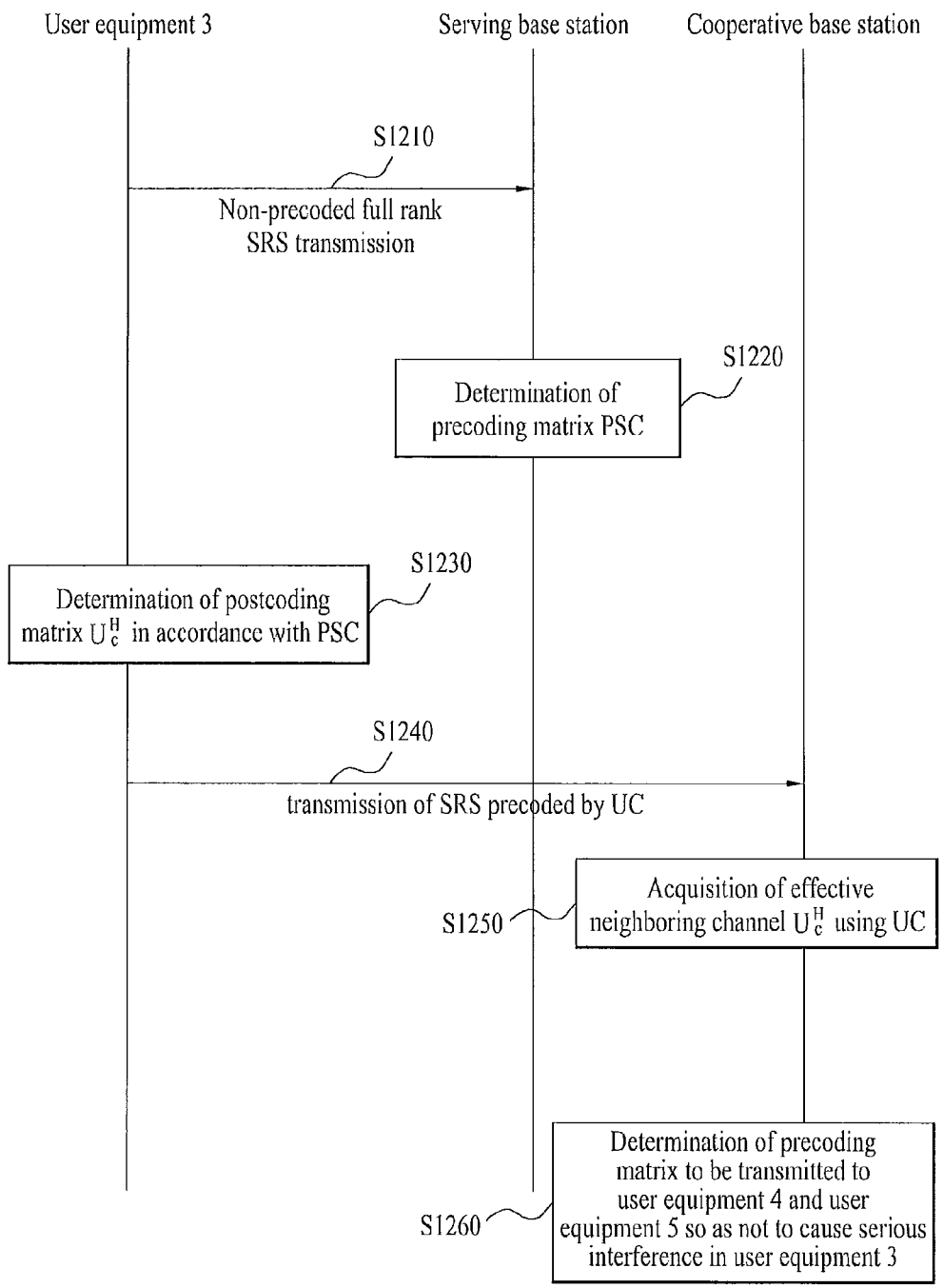
FIG. 12 is a diagram illustrating an example of a procedure for downlink CoMP CS/CB operation between a user equipment and a base station, which perform CoMP cooperative operation.

FIG. 12 is a diagram illustrating an example of a procedure for a downlink CoMP CS/CB operation between a user equipment and a base station, which perform CoMP cooperative operation.

First of all, a user equipment 3 1150 which is one of CoMP user equipments transmits a non-precoded full rank SRS to the serving base station 1120 (S1210). At this time, SRS transmission may be performed by being multiplexed with the SRS of the user equipments 1130 and 1140 located at the same cell 1110 (S1210). Then, the serving base station 1120 may estimate a downlink channel $H_{SC}$ with the user equipment 3 1150 by using the received SRS, and may determine a precoding matrix $P_{SC}$ to be used for PDSCH transmission to the user equipment 3 1150 (S1220). Although not shown, the serving base station 1120 may notify the user equipment 3 1150 of the determined precoding matrix $P_{SC}$. Afterwards, the user equipment 3 1150 may determine a receiving matrix $U_C^H$ (that may be referred to as postcoding matrix or receive beamformong matrix) in accordance with the precoding matrix $P_{SC}$ (S1230).

Generally, a downlink channel matrix and an uplink channel matrix estimated between the user equipment and the base station are in a hermitian relation. Accordingly, the user equipment 3 1150 may transmit a precoded SRS to the cooperative base station 1170 through a matrix $U_C$ corresponding to the hermitian relation of the postcoded matrix $U_C^H$ determined on the basis of mutuality of the hermitian relation in view of the channel matrix between the downlink and the uplink (S1240). This SRS transmission may be performed in such a manner that the SRSs of the user equipments 1180 and 1190 located in the cell 1160 to which the cooperative base station belongs are multiplexed (S1240).

After receiving the SRS from the user equipment 3 1150, the cooperative base station 1170 may acquire an effective neighboring channel $U_C^H H_{CC}$ (S1250). In this case, $H_{CC}$ represents the downlink channel matrix between the cooperative base station 1170 and the user equipment 3 1150. This effective neighboring channel $U_C^H H_{CC}$ indicates a channel direction toward which a receiving beam of the user equipment 3 1150 should be directed for data reception (for example, PDSCH reception) from the serving base station 1120.

Afterwards, the cooperative base station 1170 may determine a precoding matrix to be transmitted to a user equipment 4 1180 and a user equipment 5 1190, which are supported therefrom, so as not to seriously cause inter-cell interference in the user equipment 3 1150 (S1260). For example, the cooperative base station 1170 may limit a matrix existing in a null space of the effective neighboring channel $U_C^H H_{CC}$ to the precoding matrix for the user equipment 4 1180 and the user equipment 5 1190 so as not to cause interference.

The description in respect of FIG. 12 may be corrected depending on a condition. For example, at the step S1240, for SRS transmission of the user equipment 3 1150, the serving base station 1120 may transmit a control signal to the user equipment 3 1150. The control signal transmitted from the serving base station 1120 may include SRS rank information, precoding matrix information, transmission power information, transmission time instance information, SRS signature, and SRS hopping pattern information.

In order to easily perform the above operation, some resource for SRS transmission to a neighboring cell (or cooperative base station) should be reserved. For example, at the step S1240, the user equipment 3 1150 may transmit the precoded SRS by using a resource (time, SRS signature, etc.) which is previously determined. In this case, the resource, which is previously determined, is the resource reserved for SRS transmission to the cooperative base station 1170 through long-term signal exchange. In this case, the cooperative base station 1170 may easily know a channel of a user equipment where CoMP CS/CB operation should be considered.

Also, the resource which will be used for PUSCH transmission to CoMP user equipments may be determined semi-statically to avoid frequent scheduling information exchange between cooperative cells (that is, cooperative base stations that perform CoMP operation). In this case, at the step S1240, when the user equipment 3 1150 transmits the SRS precoded by the matrix $U_C$ to the cooperative base station 1170, it may transmit the SRS through a restrictive frequency resource reserved for CoMP operation not the full bandwidth.

Second Embodiment of Downlink CoMP

Figure 13:
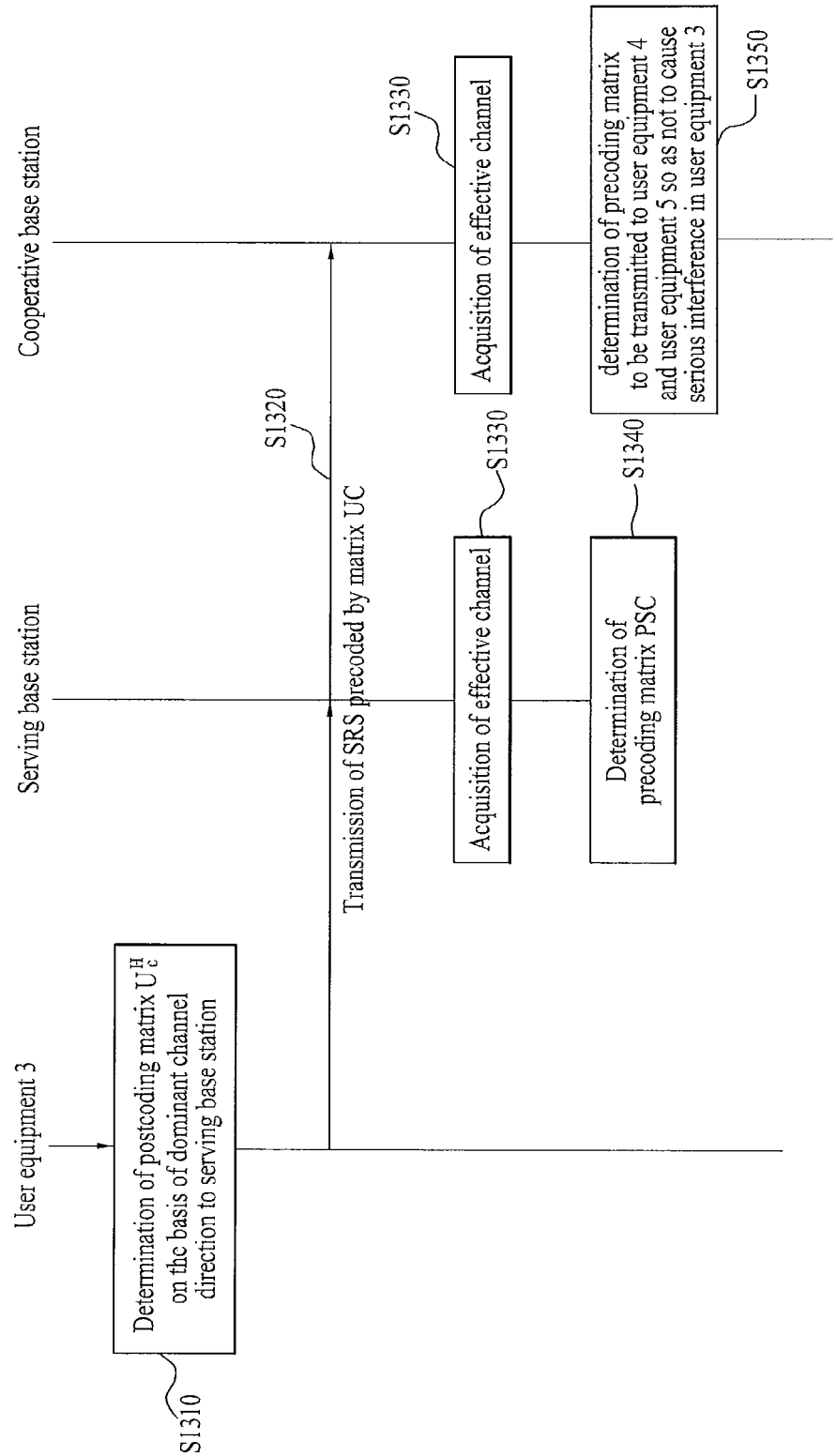
FIG. 13 is a diagram illustrating another example of a procedure for downlink CoMP CS/CB operation between a user equipment and a base station, which perform CoMP cooperative operation.

FIG. 13 is a diagram illustrating an example of a procedure for a downlink CoMP CS/CB operation between a user equipment and base stations, which perform CoMP cooperative operation.

First of all, a user equipment 3 1150 which is one of CoMP user equipments determines a receiving matrix $U_C^H$ (may be referred to as postcoded matrix or receiving beamforming matrix) on the basis of a dominant channel direction to a serving base station 1120 (S1310). For example, the matrix $U_C$ may be configured by a dominant left singular vector matrix $H_{SC}$ from the first to the $N_{R\_SRS}$th of a downlink channel between the serving base station 1120 and the user equipment 3 1150, or may be calculated by a minimum mean square error (MMSE) system on the assumption that the base station uses a precoding matrix $P_{SC}$ configured by a dominant right singular vector from the first to the $N_{R\_SRS}$ th of the downlink channel.

The user equipment 3 1150 may transmit the SRS precoded by the receiving matrix $U_C$ to the serving base station 1120 and the cooperative base station 1170 (S1320). This SRS transmission may be performed in such a manner that the SRSs of the user equipments 1130, 1140, 1180 and 1190 located in the cells 1110 and 1160 to which the serving base station 1120 and the cooperative base station belong are multiplexed (S1320).

The serving base station 1120 and the cooperative base station 1170 may respectively acquire an effective channel $U_C^H H_{SC}$ and an effective neighboring channel $U_C^H H_{CC}$ by receiving the SRSs at the step S1320 (S1330). In this case, the matrix $H_{CC}$ represents a downlink channel between the cooperative base station 1170 and the user equipment 3 1150. This effective channel $U_C^H H_{SC}$ indicates a channel direction toward which a receiving beam of the user equipment 3 1150 should be directed for data reception (for example, PDSCH reception) from the serving base station.

Afterwards, the serving base station 1120 may estimate a downlink effective channel matrix $U_C^H H_{SC}$ with the user equipment 3 1150 by using the received SRS, and may determine a precoding matrix $P_{SC}$ which will be used for PDSCH transmission to the user equipment 3 1150 (S1340).

In the mean time, the cooperative base station 1170 may determine a precoding matrix which will be transmitted to user equipments (for example, user equipment 4 1180 and user equipment 5 1190) supported therefrom so as not to cause serious inter-cell interference in the user equipment 3 1150 (S1350). For example, the cooperative base station 1170 may limit the precoding matrix for transmission to a matrix existing in a null space of the effective neighboring channel $U_C^H H_{CC}$ so as not to cause interference.

First Embodiment of Uplink CoMP

In the same manner as the aforementioned downlink CoMP operation, the uplink CoMP CS/CB system may be applied to the uplink in the same manner. Hereinafter, a procedure for the uplink CoMP CS/CB operation on the uplink will be described with reference to the accompanying drawings.

Figure 14:
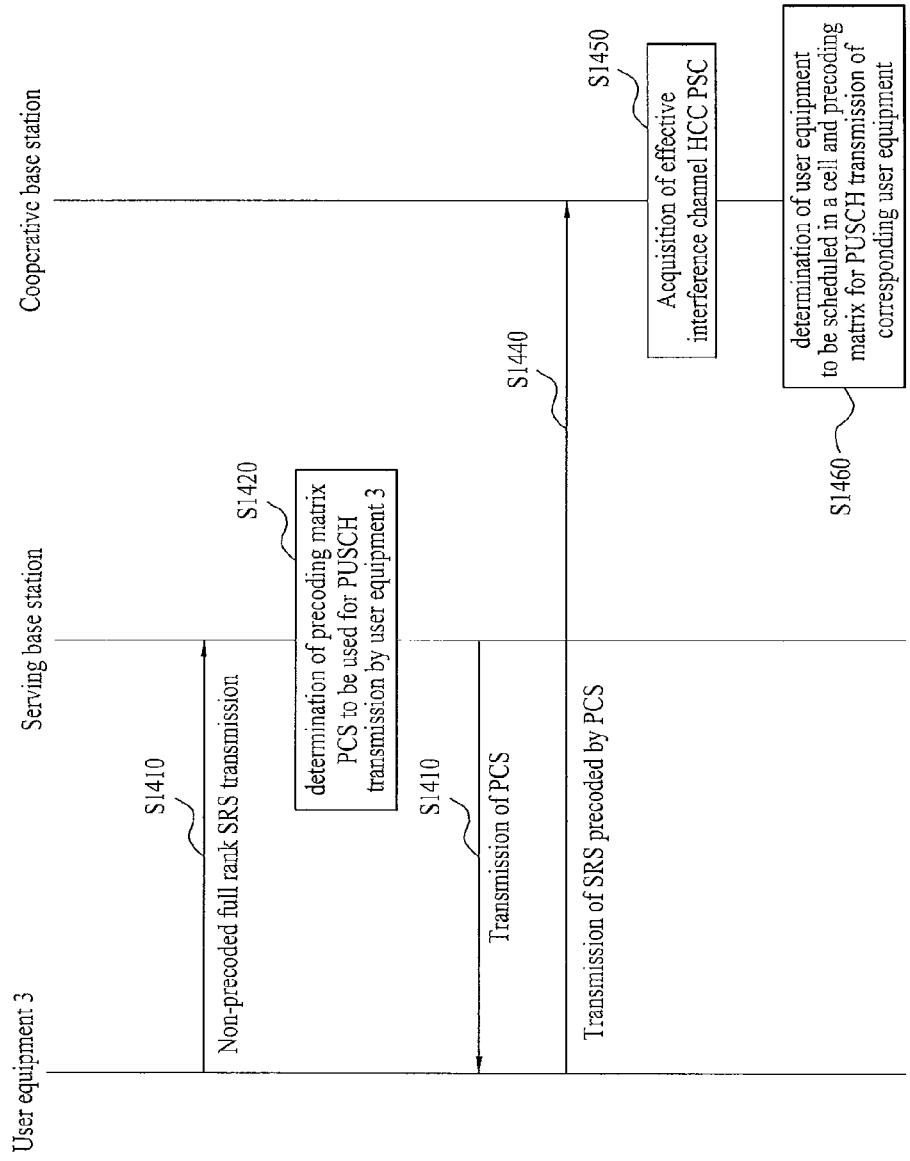
FIG. 14 is a diagram illustrating an example of a procedure for uplink CoMP CS/CB operation between a user equipment and a base station, which perform CoMP cooperative operation.

FIG. 14 is a diagram illustrating an example of a procedure for an uplink CoMP CS/CB operation between a user equipment and base stations, which perform CoMP cooperative operation.

Referring to FIG. 14, a user equipment 3 1150 which is one of CoMP user equipments transmits a non-precoded full rank SRS to a serving base station 1120 (S1410). Then, the serving base station 1120 may estimate an uplink channel matrix $H_{CS}$ with the user equipment 3 1150 by using the SRS received from the user equipment 1150, and may determine a precoding matrix $P_{CS}$ to be used for PUSCH transmission by the user equipment 3 1150 (S1420). And, the serving base station 1120 may transmit the precoding matrix $P_{CS}$ determined through a control channel such as PDCCH to the user equipment 3 1150 (S1430).

Then, the user equipment 3 1150 may transmit the precoded SRS to the cooperative base station 1170 by using the precoded matrix $P_{CS}$ (S1440). This SRS transmission may be performed by being multiplexed with the SRSs of the user equipments 1180 and 1190 located at the cell 1160 to which the cooperative base station 1170 belongs (S1440).

The cooperative base station 1170 may acquire the precoded matrix $P_{CS}$ by receiving the SRS from the user equipment 3 1150, and may acquire an effective interference channel $U_C^H H_{CS}$ by using a matrix $H_{CC}$ representing an uplink channel matrix between the cooperative base station 1170 and the user equipment 3 1150 and the acquired precoding matrix $P_{CS}$ (S1450).

Also, the cooperative base station 1170 may determine a user equipment which will perform scheduling for PUSCH transmission within its cell 1160 and a precoding matrix for PUSCH transmission of the corresponding user equipment, whereby PUSCH transmission may not be interfered by uplink transmission of the user equipment 3 1150 (S1460).

In order to easily perform the above operation, some resource for SRS transmission to a neighboring cell (or cooperative base station) should be reserved. For example, at the step S1440, the user equipment 3 1150 may transmit the precoded SRS by using a resource (time, SRS signature, etc.) which is previously determined. In this case, the resource, which is previously determined, is the resource reserved for SRS transmission to the cooperative base station 1170 through long-term signal exchange. In this case, the cooperative base station 1170 may easily know a channel of a user equipment where CoMP CS/CB operation should be considered. Also, resource which will be used for PUSCH transmission to the CoMP user equipments may be determined semi-statically to avoid frequent scheduling information exchange between cooperative cells (that is, cooperative base stations that perform CoMP operation). In this case, at the step S1430, when the user equipment 3 1150 transmits the precoded SRS to the cooperative base station 1170, it may transmit the SRS through a restrictive frequency resource reserved for CoMP operation not the full bandwidth.

If the method suggested above is used, effective channel information between the CoMP user equipment (for example, user equipment 3 1150) and the cooperative base station 1170 may effectively be transmitted even in case of great backhaul link delay. In order that the cooperative base station 1170 performs CoMP operation such as CoMP CS/CB, scheduling information of the CoMP user equipment is required together with the effective channel.

To this end, the time and frequency resources for PUSCH transmission of the CoMP user equipment may be set semi-statically, whereby CoMP user equipment scheduling information sharing through backhaul link may be minimized.

Although information sharing between cells joining in ComP operation may be solved simply through the method for determining the resource for PUSCH transmission semi-statically, communication throughput of the CoMP user equipment may be reduced due to scheduling limitation. To solve this problem, another method for sharing scheduling information of the CoMP user equipment will be described. In other words, a method for notifying a cooperative base station of scheduling information of a CoMP user equipment by using SRS configuration without separate signaling will be suggested.

For example, the CoMP user equipment may transmit SRS precoded by SRS configuration scheduled between the cells in accordance with the CoMP user equipment scheduling information, to implicitly notify the cooperative base station of scheduling information. The SRS configuration information may include various parameters such as SRS hopping pattern, comb index, sequence offset, SRS transmission subframe number, and SRS resource block which is transmitted. All or some of the parameters may be set in interaction with the CoMP user equipment scheduling information. For example, the parameters will be described with reference to FIG. 15.

Third Embodiment of Downlink CoMP

Figure 15:
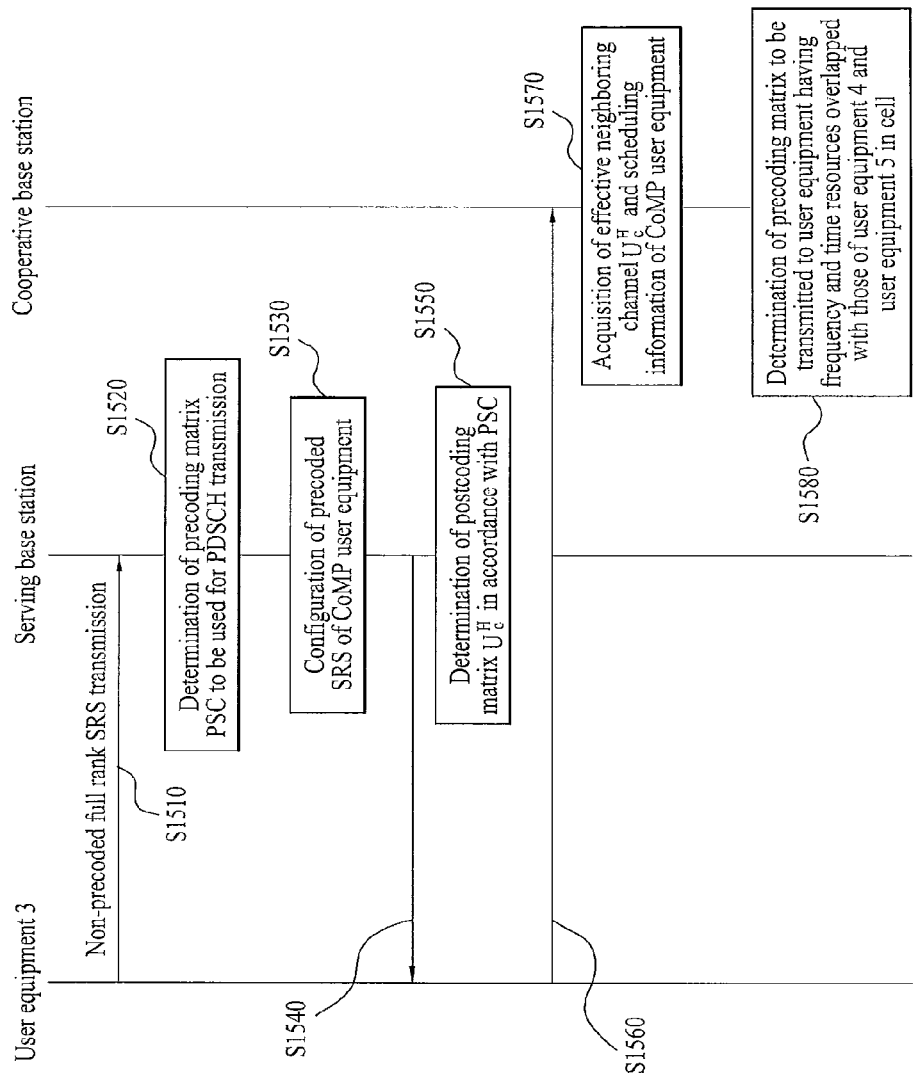
FIG. 15 is a diagram illustrating other example of a procedure for downlink CoMP CS/CB operation between a user equipment and a base station, which perform CoMP cooperative operation.

FIG. 15 is a diagram illustrating an example of a procedure for a downlink CoMP CS/CB operation between a user equipment and base stations, which perform CoMP cooperative operation.

Referring to FIG. 15, a user equipment 3 1150 which is one of CoMP user equipments transmits a non-precoded full rank SRS to a serving base station 1120 (S1510). At this time, SRS transmission may be performed by being multiplexed with the SRS of the user equipments 1130 and 1140 located at the same cell 1110 (S1510). Then, the serving base station 1120 may estimate a downlink channel $H_{SC}$ with the user equipment 3 1150 by using the received SRS, and may determine a precoding matrix $P_{SC}$ to be used for PDSCH transmission to the user equipment 3 1150 and frequency and time resources (S1520). Afterwards, the serving base station 1120 may configure precoded SRS transmission of CoMP user equipments that include the user equipment 3 1150, on the basis of scheduling information (for example, time and frequency resource information) determined at the step S1520.

Afterwards, the serving base station 1120 may signal the SRS configuration information to the user equipment 3 1150 (S1540). At this time, the signaling message from the serving base station 1120 to the user equipment 3 1150 may include SRS configuration made by SRS configuration rule shared between the cooperative base station 1170 and the serving base station 1120 and a precoding matrix $P_{SC}$ which will be used for PDSCH transmission to the user equipment 3 1150.

The user equipment 3 1150 determines a receiving matrix $U_C^H$ (that may be referred to as postcoding matrix or receive beamformong matrix) in accordance with the precoding matrix $P_{SC}$ (S1550).

The user equipment 3 1150 may transmit the SRS precoded by the matrix $U_C$ to the cooperative base station 1170 (S1560). Configuration of the precoded SRS depends on the indication determined by the serving base station 1120 at the step S1530. SRS transmission of the user equipment 3 1150 may be performed by being multiplexed with the SRS of the user equipments 1180 and 1190 located at the cell 1160 to which the cooperative base station 1170 belongs (S1560).

The cooperative base station 1170 may acquire scheduling information of the CoMP user equipments as well as an effective neighboring channel $U_C^H H_{CC}$ by using the SRS configuration rule shared with the serving base station 1120 and receiving SRS from the user equipment 3 1150 (S1570). In this case, $H_{CC}$ represents a downlink channel matrix between the cooperative base station 1170 and the user equipment 3 1150. This effective channel indicates a channel direction toward which a receiving beam of the user equipment 3 1150 should be directed for data reception (for example, PDSCH reception) from the serving base station 1120.

Also, the cooperative base station 1170 may determine a precoding matrix to be transmitted to user equipments (for example, user equipment 4 1180 and user equipment 5 1190), which are supported therefrom and allocated with the same time and frequency resource as those of the user equipment 3 1150, so as not to seriously cause inter-cell interference in the user equipment 3 1150 (S1580). For example, the cooperative base station 1170 may limit the precoding matrix which will be transmitted to the user equipments (for example, user equipment 4 1180 and user equipment 5 1190) supported therefrom and allocated with the same time and frequency resources as those of the user equipment 3 1150, a matrix existing in a null space of the effective neighboring channel $U_C^H H_{CC}$, so as not to cause interference.

Second Embodiment of Uplink CoMP

Figure 16:
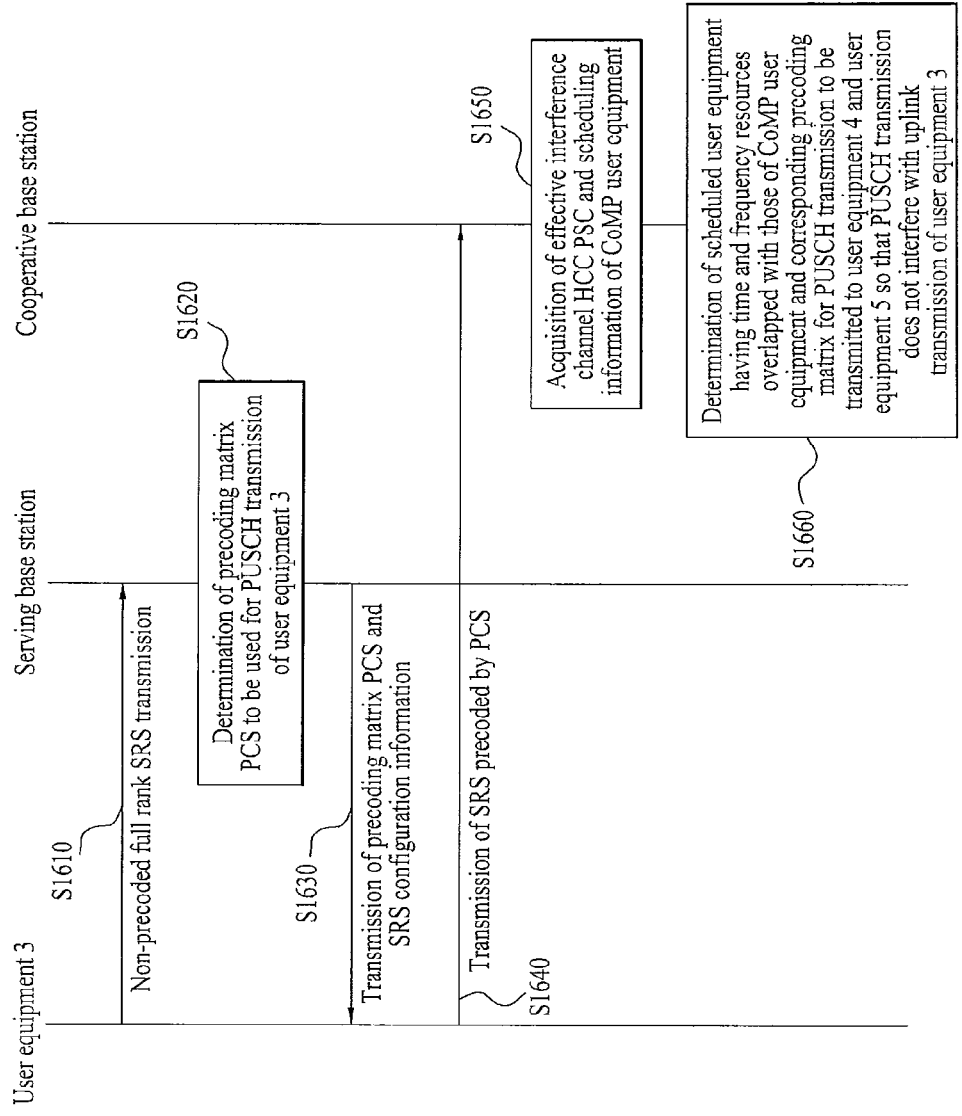
FIG. 16 is a diagram illustrating another example of a procedure for uplink CoMP CS/CB operation between a user equipment and a base station, which perform CoMP cooperative operation.

FIG. 16 is a diagram illustrating another example of a procedure for an uplink CoMP CS/CB operation between a user equipment and base stations, which perform CoMP cooperative operation.

Referring to FIG. 16, a user equipment 3 1150 which is one of CoMP user equipments transmits a non-precoded full rank SRS to a serving base station 1120 (S1610). At this time, SRS transmission of the user equipment 3 1150 may be performed by being multiplexed with SRSs of user equipments 1130 and 1140 located at the same cell 1110 (S1610).

Then, the serving base station 1120 may estimate an uplink channel matrix $H_{CS}$ with the user equipment 3 1150 by using the SRS received from the user equipment 1150, and may determine a precoding matrix $P_{CS}$ to be used for PUSCH transmission to the serving base station 1120 by the user equipment 3 1150 (S1620). And, the serving base station 1120 may transmit the precoding matrix $P_{CS}$ determined through a control channel such as PDCCH and SRS configuration information to the user equipment 3 1150 (S1630). At this time, the SRS configuration may be determined in accordance with the scheduling result of the CoMP user equipment.

Then, the user equipment 3 1150 may transmit the precoded SRS to the cooperative base station 1170 by using the precoded matrix $P_{CS}$ (S1640). This SRS transmission may be performed by being multiplexed with the SRSs of the user equipments 1180 and 1190 located at the cell 1160 to which the cooperative base station 1170 belongs (S1640).

The cooperative base station 1170 may acquire scheduling information of the CoMP user equipment as well as an effective interference channel $H_{CC}P_{CS}$ by receiving the SRS from the user equipment 3 1150 and using the SRS configuration information known through sharing with the serving base station 1120 (S1650). In this case, $H_{CC}$ represents an uplink channel matrix between the cooperative base station 1170 and the user equipment 3 1150.

Also, the cooperative base station 1170 may determine a scheduled user equipment and a precoding matrix for PUSCH transmission by being allocated with time and frequency resource overlapped with the CoMP user equipment within its cell 1160, whereby PUSCH transmission may not be interfered by uplink transmission of the user equipment 3 1150 (S1660). For example, the cooperative base station 1170 may limit the effective channel of the PUSCH precoding matrix to a matrix existing in a null space of the effective neighboring channel $U_C^H H_{CC}$ so as not to cause interference.

For SRS configuration based on the CoMP user equipment (for example, user equipment 3 1150) scheduling information, the cooperative base station 1170 may implicitly notify the CoMP user equipment (for example, user equipment 3 1150) scheduling information by using a resource block (RB) to which SRS transmission subframe number and SRS of SRS configuration parameters are transmitted. First of all, the serving base station 1120 sets SRS RB transmitted to implicitly indicate a frequency resource allocated to the cooperative base station 1170 to a scheduled frequency and sets SRS transmission subframe number to "PDSCH transmission subframe number-N" to indicate a scheduled time resource, that is, PDSCH transmission subframe number (in this case, N is a positive integer, is scheduled between CoMP base stations, is varied semi-statically, or is a fixed value.).

As described above, if SRS configuration interacts with scheduling, since scheduling of a CoMP user equipment (for example, user equipment 3 1150) should be performed within the range that does not violate the existing SRS configuration of two base stations 1120 and 1170 that perform CoMP cooperation, scheduling restriction occurs. In other words, a resource that can be allocated to the CoMP user equipment (for example, user equipment 3 1150) may be limited to the Nth subframe after a subframe number that enables SRS transmission, on the time axis and SRS RB on the frequency axix, which enables transmission without any collision with the other user equipments, instead of all the PDSCH (PUSCH in case of uplink) regions.

However, this method is advantageous in that flexible and dynamic scheduling may be performed as compared with the method for semi-statically fixing a resource of a CoMP user equipment (for example, user equipment 3 1150). Also, in a heterogeneous cell environment where a micro cell and a macro cell of a closed subscribed group (CSG) cell coexist, it is difficult to share CoMP information through a backhaul link and robust inter-cell interference occurs. In this respect, throughput degradation caused by scheduling restriction may be compensated by CoMP gain according to the method suggested as above.

In the aforementioned embodiment, although the serving base station 1120 explicitly configures SRS of the CoMP user equipment in accordance with the scheduling result, the serving base station 1120 may carry scheduling information in the PDCCH before transmitting the PDSCH to the CoMP user equipment (for example, user equipment 3 1150), and may previously notify the CoMP user equipment (for example, user equipment 3 1150) of the scheduling information, whereby the user equipment may perform precoded SRS transmission in accordance with the scheduled SRS configuration rule. In case of the latter case, although the serving base station 1120 should notify the CoMP user equipment (for example, user equipment 3 1150) of the semi-statically varied or fixed N value (that is, SRS transmission subframe number (or index), it does not need to additionally perform signaling for precoded SRS configuration of the CoMP user equipment (for example, user equipment 3 1150).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The apparatus for performing CoMP communication using a precoded sounding reference signal and the method for the same may industrially be applied to wireless communication systems such as 3GPP LTE, 3GPP LTE-A, and IEEE 802.

The invention claimed is:

1. A method for performing a coordinated multi-point (CoMP) communication using a precoded sounding reference signal, the method comprising:
receiving, at a base station from a user equipment of a neighboring cell, a sounding reference signal (SRS) precoded by a first matrix $U_C$;
acquiring an effective neighboring channel matrix using a hermitian matrix of the first matrix and a downlink channel matrix $H_{CC}$ between the user equipment and the base station; and
determining a precoding matrix to be transmitted to one or more user equipments served by the base station on the basis of the effective neighboring channel matrix,
wherein the effective neighboring channel matrix indicates a direction toward which a receiving beam is directed for data reception of the user equipment from a serving base station.

2. The method according to claim 1, wherein the first $U_C$ matrix corresponds to a precoding matrix determined by the user equipment for applying to the SRS on the basis of a precoding matrix $P_{SC}$ determined by the serving base station.

3. The method according to claim 1, wherein the effective neighboring channel matrix is expressed by multiplication of the hermitian matrix $U_C^H$ of the first matrix and the downlink channel matrix $H_{CC}$ between the user equipment and the base station.

4. The method according to claim 1, further comprising acquiring CoMP scheduling information of the user equipment from the received SRS, wherein the determining the precoding matrix includes determining a precoding matrix to be transmitted for one or more user equipments having a time or frequency overlapped with the time or frequency resource scheduled for the user equipment, wherein the one or more user equipments is served by the base station.

5. The method according to claim 4, wherein the determined precoding matrix exists in a null space of the effective neighboring channel.

6. The method according to claim 1, wherein the SRS is transmitted through pre-reserved a time or frequency resource.

7. A base station for performing a coordinated multi-point (CoMP) communication using a precoded sounding reference signal, the base station comprising:
a receiver receiving a sounding reference signal (SRS) precoded by a first matrix $U_C$ from a user equipment of a neighboring cell; and
a processor acquiring an effective neighboring channel matrix using a hermitian matrix of the first matrix from the received SRS and a downlink channel matrix $H_{CC}$ between the user equipment and the base station, and determining a precoding matrix to be transmitted to one or more user equipments served by the base station on the basis of the effective neighboring channel matrix,
wherein the effective neighboring channel matrix indicates a direction toward which a receiving beam is directed for data reception of the user equipment from a serving base station.

8. The base station according to claim 7, wherein the processor further acquires CoMP scheduling information of the user equipment from the received SRS, and determines a precoding matrix to be transmitted for one or more user equipments having a time or frequency overlapped with the time or frequency resource scheduled for the user equipment, wherein the one or more user equipments is served by the base station, on the basis of the acquired scheduling information.

9. The base station according to claim 8, wherein the precoding matrix determined by the processor exists in a null space of the effective neighboring channel.

10. The base station according to claim 7, wherein the SRS is transmitted through a pre-reserved time or frequency resource.

* * * * *